United States Patent [19]
Boston et al.

[11] Patent Number: 5,515,493
[45] Date of Patent: May 7, 1996

[54] WINDOW RESTORATION METHODS FOR HALTED DEBUGEE WINDOW APPLICATIONS

[75] Inventors: Jeffrey S. Boston, Wappingers Falls; Donald P. Pazel, Montrose; Zvi P. Weiss, New City, all of N.Y.

[73] Assignee: International Business Machines Corporation, Armonk, N.Y.

[21] Appl. No.: 541,936

[22] Filed: Oct. 10, 1995

Related U.S. Application Data

[63] Continuation of Ser. No. 859, Jan. 5, 1993, abandoned.

[51] Int. Cl.$^6$ ........................................... G06F 3/14
[52] U.S. Cl. ................. 395/157; 395/153; 395/161; 395/158
[58] Field of Search ....................... 395/153, 155, 395/156, 157, 158, 160, 161

[56] References Cited

U.S. PATENT DOCUMENTS

| | | | |
|---|---|---|---|
| 4,589,068 | 5/1986 | Heinen, Jr. | 395/575 |
| 4,703,446 | 10/1987 | Momose | 364/580 |
| 4,720,778 | 1/1988 | Hall et al. | 395/575 |
| 4,860,247 | 8/1989 | Uchida et al. | 395/153 |
| 4,872,167 | 10/1989 | Maezawa et al. | 371/19 |
| 4,885,717 | 12/1989 | Beck et al. | 395/775 |
| 4,903,218 | 2/1990 | Longo et al. | 395/157 |
| 4,941,102 | 7/1990 | Darnell et al. | 395/75 |
| 4,943,968 | 7/1990 | Hirose et al. | 371/19 |
| 5,038,348 | 8/1991 | Yoda et al. | 371/19 |
| 5,050,105 | 9/1991 | Peters | 345/119 |
| 5,204,947 | 4/1993 | Bernstein et al. | 395/157 |
| 5,289,574 | 2/1994 | Sawyer | 395/157 |
| 5,363,483 | 11/1994 | Jones et al. | 395/161 |

FOREIGN PATENT DOCUMENTS

0470322A1  2/1992  European Pat. Off. .

OTHER PUBLICATIONS

"Method for Providing a Separate Display for Debugger I/O Operations", IBM Tech. Discl. Bull. vol. 31, No. 8, Jan. 1989 W. J. Cheney.
OS/2 2.0 Technical Library, Presentation Manager Programming Ref. vol. II, version 2.00—IBM Programming Family.
OS/2 2.0 Technical Library, Presentation Manager Programming Ref. vol. III, Version 2.00—IBM Programming Family.
IEEE Computer Society Press "Visualization '91", Oct. 22–25, 1991 pp. 255–261 by A. Tuchman, D. Jablonowski and G. Cybenko.
European Patent Office Communciation dated Apr. 28, 1994.

*Primary Examiner*—Raymond J. Bayerl
*Assistant Examiner*—Ruay Lian Ho
*Attorney, Agent, or Firm*—Perman & Green

[57] ABSTRACT

A first method manages a display screen window of an application program that is halted and includes the following steps: in responsive to an application program being halted, (a) copying the informational content of a window of the halted application program; (b) creating a second window, referred to as a shadow window, to be in registration with the window of the halted application program such that the window of the halted application program is hidden from the view of an observer of the display screen; (c) painting the second window with the copy of the informational content of the halted application program; and (d) in response to a message to re-paint the second window, re-painting the second window with the copy of the informational content of the halted application program. A second method is responsive to an application program being halted for (a) copying the window or windows of the halted application program; (b) intercepting a window re-paint message that is directed to the halted application program; and (c) re-painting the display screen window of the halted application program with that portion of the copy that corresponds to the window of the halted application program. Both methods may also invalidate obscured portions of the application window, such as by setting the corresponding portion of the copy to some predetermined color.

16 Claims, 4 Drawing Sheets

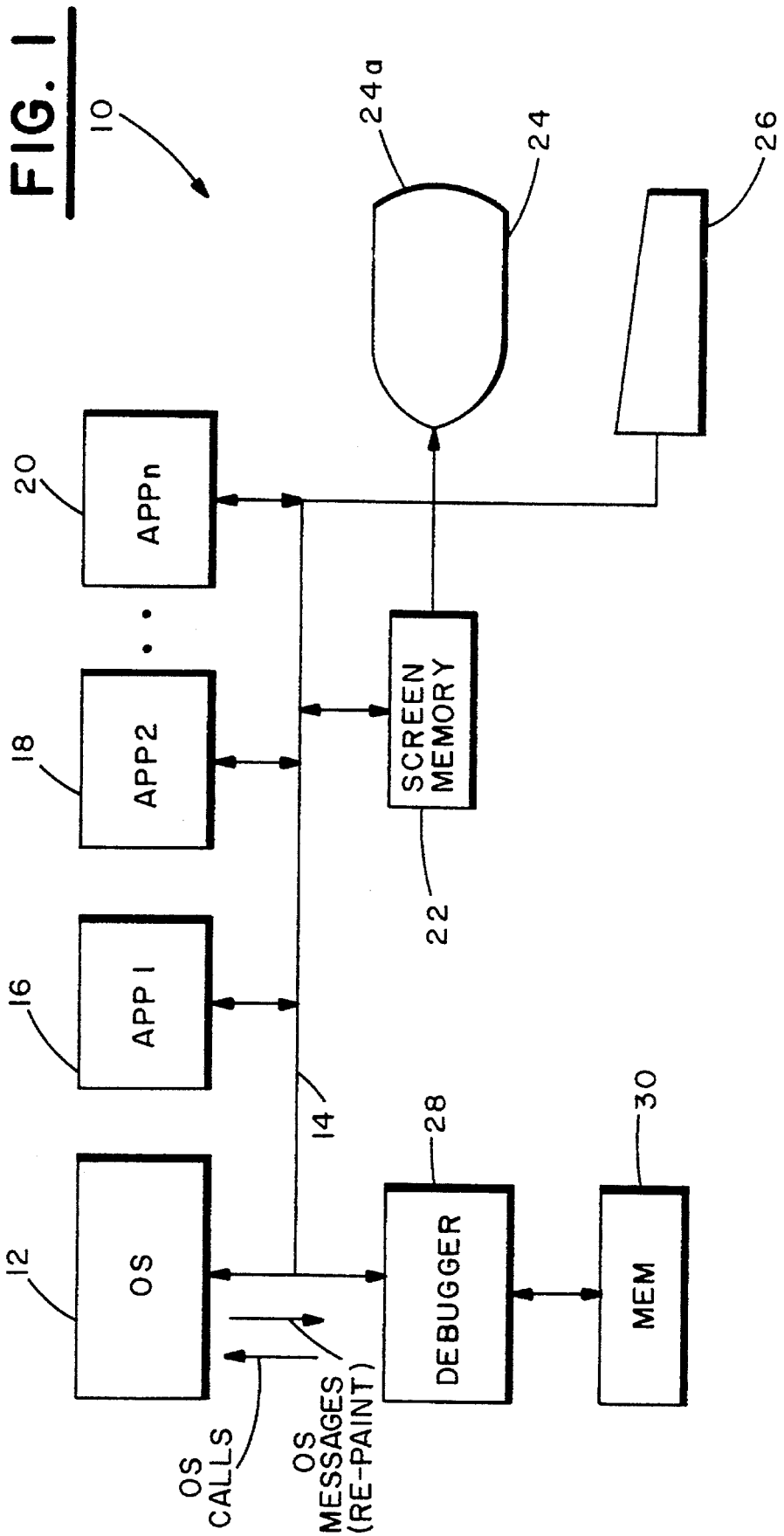

WINDOW RESTORATION METHODS FOR HALTED DEBUGEE WINDOW APPLICATIONS

This is a continuation of application Ser. No. 08/000,859 filed on Jan. 5, 1993, now abandoned.

FIELD OF THE INVENTION

This invention relates generally debugging facilities for use with digital data processors and, in particular, to debugging facilities for use with application programs having simultaneously displayed screen window areas.

BACKGROUND OF THE INVENTION

Application programs that are written toward windowed and graphical capabilities of operating systems often contain specialized programming to paint the contents of the application windows. Examples of such specialization include programming to construct graphs, charts, or complex diagrams related to specific domains of knowledge. In effect, what is drawn, or painted, within an application's window is specific to the application, and is independent of the operating system.

One function of a debugger is to enable an application to be stopped at selected places in its programming in order to observe various execution states of the application. An application which is so operated upon by a debugger is referred to herein as a "debuggee". However, when a debuggee window application is stopped by a debugger, it is no longer possible for the application to re-paint or refresh its windows, in that the programming that paints the windows cannot be executed. Consequently, if other, non-halted application windows are placed over the debuggee's windows and then subsequently removed, the images of these windows remain over the debuggee windows. This undesirable condition is known as "ghosting".

Because the ghosting effect tends to obfuscate the work environment, the visual content of the debuggee's window(s) is not available to contribute important information that is relevant to the debugging of the application.

The following U.S. Patents are exemplary of various program debugging and/or windowing systems:

U.S. Pat. No. 4,589,068 "Segmented Debugger" (Heinen, Jr.); U.S. Pat. No. 4,703,446 "Data Processing Unit Diagnosis Control Apparatus" (Momose); U.S. Pat. No. 4,720,778 "Software Debugging Analyzer" (Hall et al.); U.S. Pat. No. 4,872,167 "Method for Displaying Program Executing Circumstances and an Apparatus Using the Same" (Maezawa et al.); U.S. Pat. No. 4,885,717 "System for Graphically Representing Operation of Object-Orientated Programs" (Beck et al.); commonly assigned U.S. Pat. No. 4,941,102 "Two-Step Debugger for Expert Systems" (Darnell et al.); U.S. Pat. No. 4,943,968 "Method of Displaying Execution Trace in a Logic Programming Language Processing System" (Hirose et al.); U.S. Pat. No. 5,038,348 "Apparatus for Debugging a Data Flow Program" (Yoda et al.); and commonly assigned U.S. Pat. No. 5,050,105 "Direct Cursor-Controlled Access to Multiple Application Programs and Data" (Peters).

Also of interest is an IBM Technical Disclosure Bulletin, Vol. 31, No. 8, January 1989 entitled "Method for Providing a Separate Display for Debugger I/O Operations" by W. J. Cheney.

The teaching of the foregoing patents and literature does not, however, provide a satisfactory solution to the ghosting effect that was described previously.

It is thus one object of this invention to provide a debugger that employs a window restoration method for a halted application.

It is a further object of this invention to provide a method that prevents the loss of information within a window of a halted application program.

SUMMARY OF THE INVENTION

The foregoing and other problems are overcome and the objects of the invention are realized by methods and apparatus for managing the windows of a halted application program so as to eliminate the ghosting effect.

A first method is employed with a data processing system of a type that has a plurality of application programs, wherein application programs are capable of having at least one display screen window associated therewith. The method manages a display screen window of an application program that is halted and includes the following steps. In response to an application program being halted, a debugger operates to (a) copy the informational content of a window of the halted application program; (b) create a second window, referred to herein as a shadow window, to be in registration with the window of the halted application program such that the window of the halted application program is hidden from the view of an observer of the display screen; (c) paint the second window with the copy of the informational content of the halted application program; and (d) in response to a message to re-paint the second window, re-paint the second window with the copy of the informational content of the halted application program.

The step of painting preferably includes a preliminary step of invalidating portions of the copy that correspond to any obscured portions of the window of the halted application program, such as by setting the invalidated portions of the copy to a predetermined color.

A second method is also employed with a data processing system of a type that has a plurality of application programs, wherein application programs are capable of having at least one display screen window associated therewith. The second method manages a display screen window of an application program that is halted and includes the following steps.

In response to an application program being halted, the debugger operates to (a) initialize a screen image buffer and copy to the buffer the window(s) of the halted application program; (b) intercept a window re-paint message that is directed to the halted application program; and (c) re-paint the display screen window of the halted application program with the copy of the window that corresponds to the window of the halted application program that is to be re-painted.

As in the first method, obscured portions of the window may be invalidated before being re-painted.

The invention also provides embodiments of application debuggers that operate in accordance with the foregoing methods.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is a block diagram of a data processing system that operates in accordance with this invention;

DETAILED DESCRIPTION OF THE INVENTION

Figure 2A:
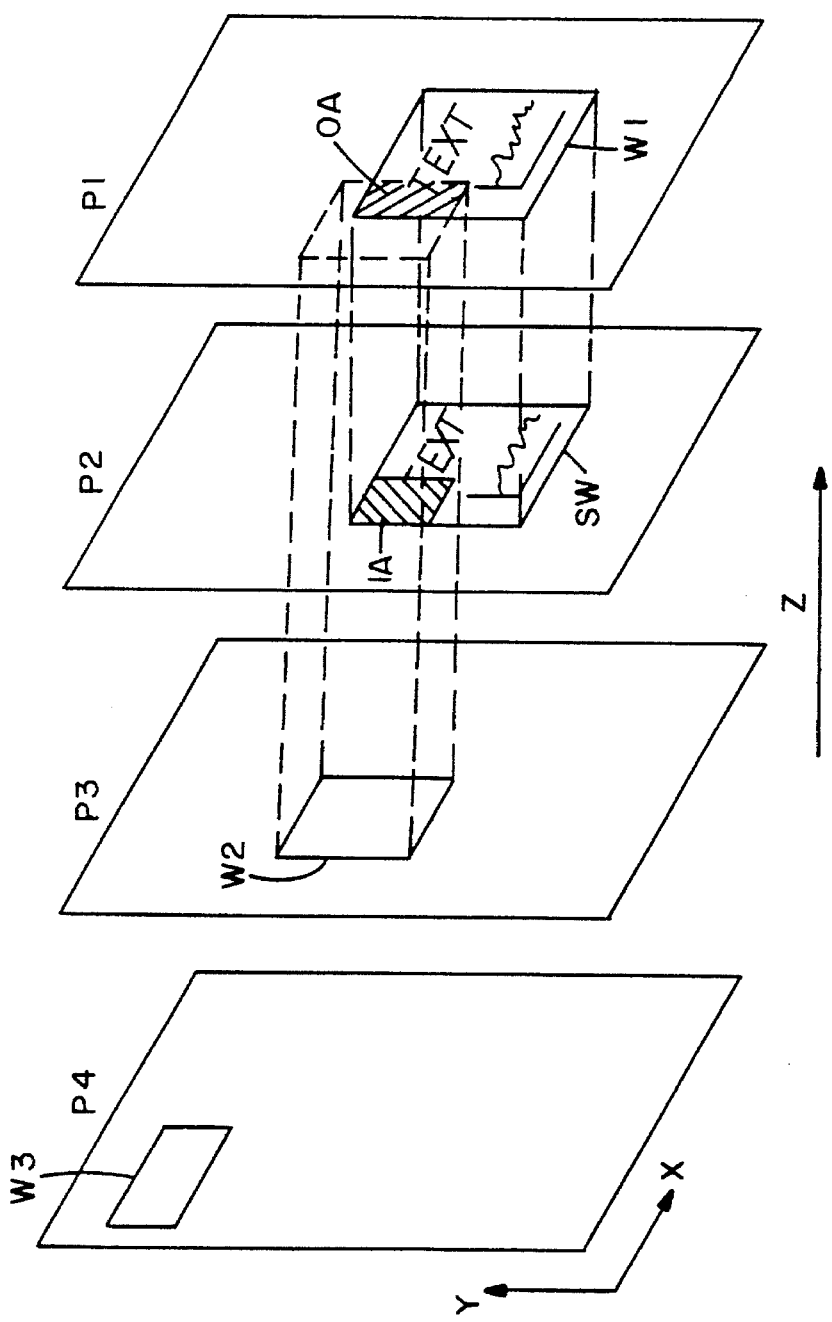
FIGS. 2a–2b illustrate a plurality of display screen planes and the effect of the operation of a method of the invention.

FIG. 1 is a block diagram of a data processing system 10 that operates in accordance with this invention. System 10 includes an operating system (OS) 12 that is coupled, via a logical bus 14, to a plurality of application programs designated APP1 16, APP2 18 and APPn 20. Also coupled to bus 14 is a screen memory 22 having an output that provides display data to a display monitor 24 having a display screen 24a. A keyboard 26 provides a data entry function for use by an operator of the system 10. The system 10 further includes a debugging application program (DEBUGGER) 28. The debugger 28 is coupled to an associated memory (MEM) 30, the use of which is described below.

Although shown as separate blocks that are coupled to the logical bus 14, it should be realized that in practice the application programs 16–20 and the debugging application program 28 are embodied in assemblages of computer instructions that are stored within a system memory. The OS 12 schedules the execution of the various application programs such that the application programs appear to run concurrently. In the system 10, each application program is capable of owning and displaying information within at least one window that appears upon the display screen 24. A window is considered to be a predetermined area of the display screen 24a. A window of one application program may partially or totally overlie a window of one or more other application programs. Predetermined window-related calls are made by the application programs 16–20 and 28 to the OS 12 over the logical bus 14, and window-related messages are received by the applications over the logical bus 14 from the OS 12.

The OS 12 may be embodied in an operating system known as OS/2 (OS/2 is a registered trademark of the International Business Machines Corporation). For this embodiment, the predetermined OS 12 window-related calls and messages are detailed below. However, it should be realized that the teaching of this invention is not limited for use with any one particular type of operating system.

The debugger 28 is assumed to include facilities for providing calls to the OS 12 for halting a specified one of the application programs 16–20, for stepping the halted application program, for running the halted application program, and for performing other conventional debugging functions.

In accordance with this invention, two methods are now described that provide for debuggee window restoration when the debuggee is halted by the debugger 28. The ensuing description assumes that APP1 16 is the halted application (debuggee).

SHADOW-WINDOW Method

Figure 3:
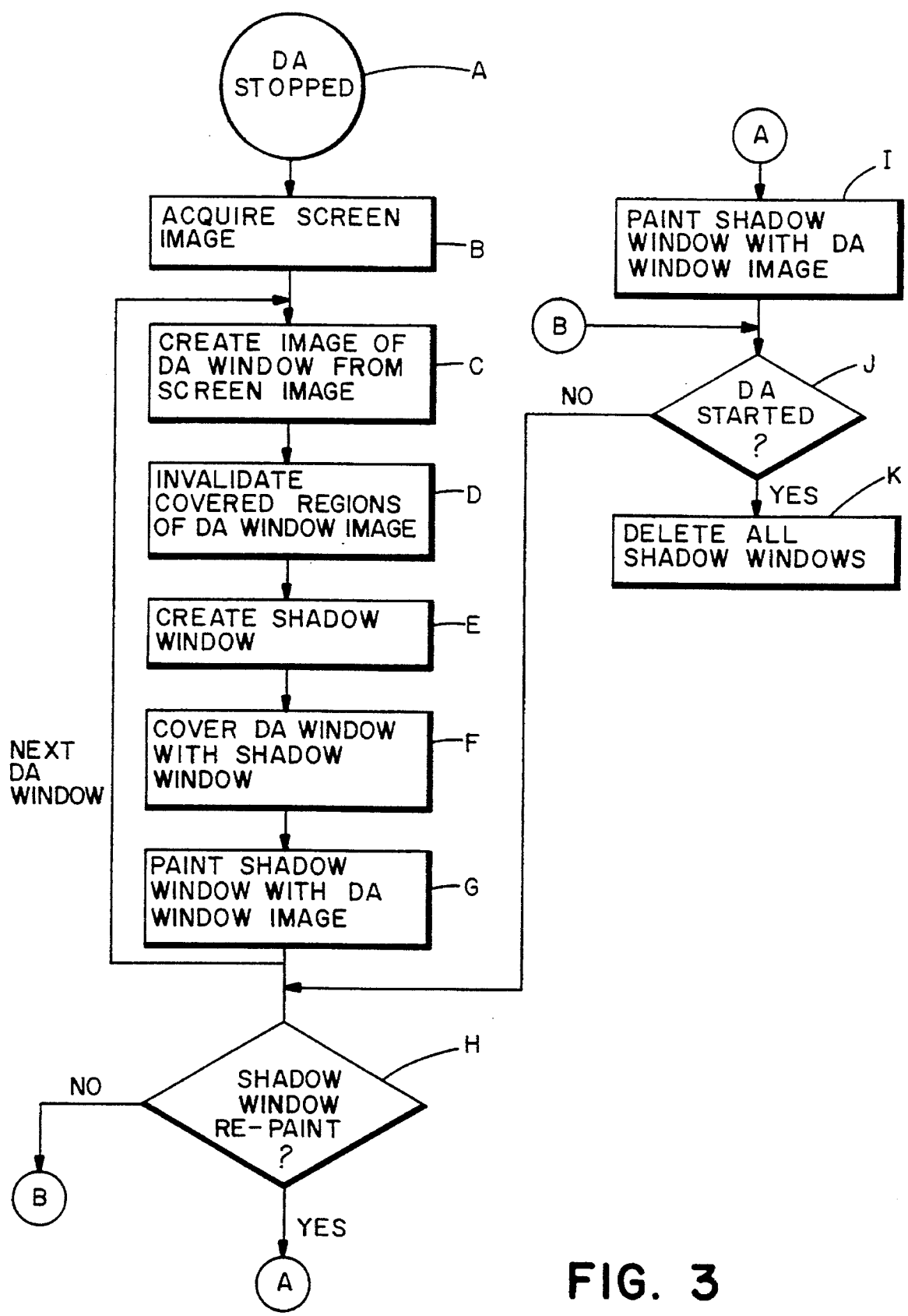
FIG. 3 is a flowchart that illustrates a first method of the invention.

Reference is made to the flow chart of FIG. 3. In the Shadow-Window method, the debugger 28 is responsive to the debuggee application (DA) being halted (Block A), at the end of a step or run command, for acquiring a screen image from the screen memory 22 (Block B). The debugger 28 then generates OS 12 calls to query the OS 12 for size and location information of all the debuggee's windows. For each of the debuggee windows, the debugger 28 then makes a copy in MEM 30 of the current contents of that window (Block C).

It is noted that portions of the debuggee window may be covered by other windows. Since it is impossible to construct the application's intentions in painting the covered regions, the covered regions of the debuggee's windows are preferably invalidated in the MEM 30 copy by coloring each covered region with some pre-selected color (Block D).

Next, for each debuggee window the debugger 28 creates a window in registration with the debuggee window. That is, the debugger creates a window of equal size and display screen position that is adjacent to the window z-order of the corresponding debuggee window (Blocks E and F). The window or windows that are thus created by the debugger 28 are referred to herein as "shadow windows". Ordering refers to the fact that each window is located on a separate logical image plane within the screen memory 22, with the planes being stacked from back to front along a z-axis (depth). As such, the shadow window is inserted between the debuggee window plane and a plane that is located closer to the observer. The shadow windows so created are owned by the debugger 28 and are thus not halted. Each debuggee window is fully covered by a corresponding shadow window and, consequently, is not required to be re-painted.

The debugger 28 next paints the shadow window with the contents of the corresponding debuggee application window that is stored within MEM 30 (Block G), including any invalidated portion or portions thereof.

At Block H, the debugger responds to an OS 12 message to re-paint a shadow window and uses the saved MEM 30 image of the corresponding debuggee window to perform the re-painting (Block I). A re-paint message may be generated by the OS 12 upon the deletion of another application's window that had been created to partially or completely overlie the location of the shadow window, which also coincides with the location of the debuggee's window. In that the debuggee is incapable of responding to the re-paint message, the removal of the overlying window of the other application would conventionally result in the partial or total destruction of the information content within the debuggee window.

However, in that the debuggee window is totally covered by the shadow window, the debuggee window is effectively isolated from any user actions that would trigger a re-paint command for the debuggee window. As a result, the OS 12 will not generate re-paint messages for the debuggee window, but will instead generate re-paint messages for the overlying shadow window. The shadow windows thus serve as surrogates for the debuggee windows. The effect is that the user continues to observe the image of the debuggee window or windows at the point at which the debuggee application was halted, and the ghosting problem referred to above is eliminated.

At Block J the debugger 28 determines that the debuggee application has been restarted, and then deletes all shadow windows for the previously halted application. Deleting the shadow windows exposes the underlying application windows, it being assumed that the previously halted application is once more capable of re-painting its associated window or windows.

Figure 2B:
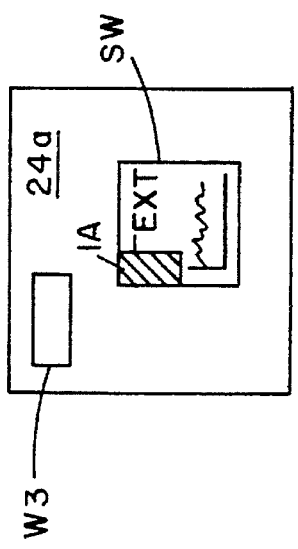

FIGS. 2a and 2b illustrate the effect of the operation of the method of the invention at Block G of FIG. 3. In FIG. 2a, image plane 1 (P1) has a window (W1) that is associated with APP1 16. Image plane 3 (P3) has a window (W2) that is associated with APP2 18. W2 partially overlies W1, resulting in the creation of an obscured area (OA) in W1. The shadow window (SW) that is created by the debugger 28 for W1 is shown displayed at image plane P2, with SW having an invalid area (IA) that corresponds to the OA of W1. The SW displays the information that was present within W1 at the time that APP1 16 was stopped (Block A of FIG. 3), the displayed information being retrieved from MEM 30 by the debugger 28 during the execution of Block G of FIG. 3. The SW is located nearer to the observer than is W1, and is positioned so as to overlie and completely hide from the observer's view the information within W1. P4 has a window (W3) that is associated with APPn 20. W3 does not overlie any other windows of the display screen 24a.

FIG. 2b illustrates the display screen image that is viewed by the observer, it being assumed that W2 is no longer being displayed by APP2 18. As can be seen, the observer views the information content of the SW and not W1, in that W1 is located behind the SW. If another application, such as APP2 16, were to create and then remove a window that overlies W1, the information within W1 is not lost during the time that APP1 16 is halted, as the debugger 28 will, in response to a re-paint message from the OS 12, re-paint the SW with the stored information for W1. Thus, the problem of the ghosting effect is overcome.

FULL-IMAGE Method

Figure 4:
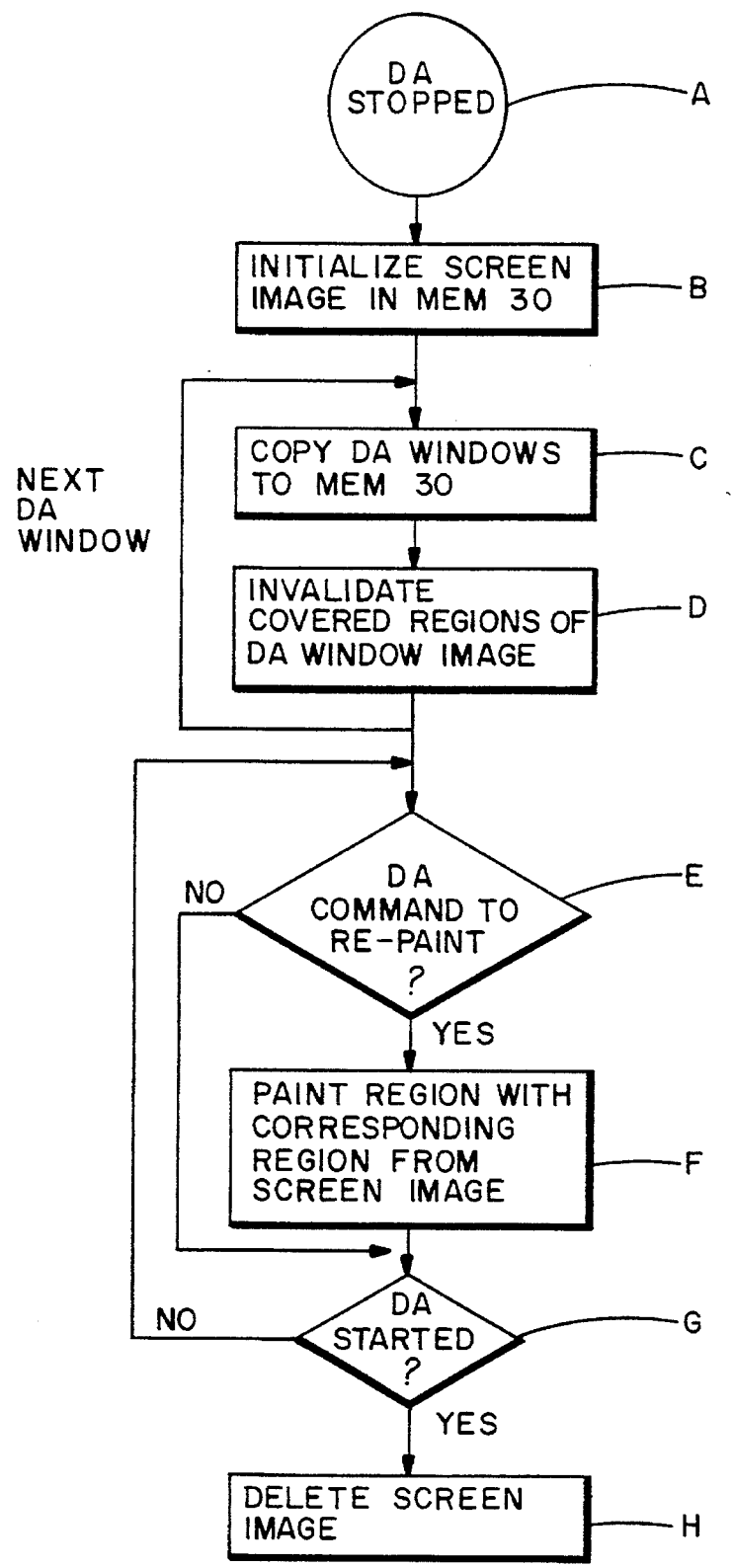
FIG. 4 is a flowchart that illustrates a second method of the invention.

Reference is made to FIG. 4. The Full-Image method is based on an assumption that the debugger 28 intercepts from the logical bus 14 all OS 12 generated debuggee window re-paint messages. The debugger 28 is responsive to the debuggee application (DA) being halted (Block A) for initializing the screen buffer stored in MEM 30 to, for example, the color selected for invalidated window portions (Block B). The debugger 28 queries the OS 12 for size and location information of all the debuggee's windows and, at Block C, copies the debuggee window or windows to the screen buffer in MEM 30. Any required debuggee window invalidation is performed at Block D, as described above for the corresponding block of FIG. 3.

When the debugger 28 intercepts a re-paint message for a debuggee window (Block E), the debugger 28 cross-references the window area to be re-painted with the window image bitmap stored in MEM 30, and uses that part of the bitmap to paint directly to the image displayed on the display screen 24a in the region where the debuggee window resides (Block F). As such, the debugger 28 maintains a copy of the debuggee window or windows and assumes the task of re-painting the debuggee windows during the time that the debuggee is halted.

At Blocks G and H, in response to the application being restarted, the debugger 28 deletes the copy of the debuggee window image that is stored within the MEM 30.

For the case where the OS 12 is the OS/2 operating system, the debugger 28 employs several operating system calls to determine the required information for the display screen windows. These OS/2 calls, and the information returned to the caller, are documented in a publication entitled OS/2 Technical Library-Presentation Manager Programming Reference Volume II, version 2.00 (S10G-6265-00). Specifically, the OS/2 calls employed by the debugger 28 are as follows.

| OS/2 CALL | FUNCTION |
| --- | --- |
| WinBeginEnumWindow (pg. 8–16) | Query Parent and Z-ordering of Windows |
| WinEndEnumWindow (pg. 8–139) | Query Parent and Z-ordering of Windows |
| WinGetNextWindow (pg. 8–186) | Query Parent and Z-ordering of Windows |
| WinQueryWindowPos (pg. 8–386) | Query Size and Position of Window |
| WinBeginPaint (pg. 8–18) | Query Size and Position of Area of Window to Re-paint after receiving a WM_PAINT message from the OS 12 |

The debugger 28 is responsive to the WM_PAINT message that is received from OS/2 when a window must be re-painted. The WM_PAINT message is described at page 12–47 in a publication entitled: OS/2 Technical Library-Presentation Manager Programming Reference Volume III, version 2.00 (S10G-6272-00).

The choice between the shadow window and full-image methods is dependent upon the ability of the debugger 28 to intercept the debuggee's WM_PAINT messages from the OS 12. If the debugger 28 cannot intercept for the debuggee which areas of the screen to paint, the shadow window method is preferred. If the debugger 28 can intercept directly the debuggee's WM_PAINT request message from the OS 12, then the full-image method is preferred. It should be noted that the shadow window method has the side-effect that when the shadow windows are eliminated and control is given back to the debuggee, a full-window re-paint message is generated by the OS 12 for all the debuggee windows (i.e. the windows have been "uncovered"). This may potentially perturb the application environment more than would be the case using the full-image technique.

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. In a data processing system of a type having a display screen means and a plurality of application programs, wherein application programs are capable of having at least one display screen window associated therewith, a method for operating a display screen window manager to manage a display screen window of an application program that is halted while at least one other application program having a display screen window continues to run, comprising the steps of:

responsive to an application program being halted, copying the informational content of a window of the halted application program;

creating a second window in registration with the window of the halted application program, the second window being of at least equal size and display screen position as the window of the halted application program and located nearer to an observer along a display screen depth axis than the window of the halted application program such that the window of the halted application program is hidden from the view of the observer of the display screen means;

painting the second window with the copy of the informational content of the halted application program; and in response to a message to re-paint the second window, re-painting the second window with the copy of the informational content of the halted application program.

2. A method as set forth in claim 1 wherein the step of copying includes a preliminary step of determining an area of a display screen means that is occupied by the window of the halted application program.

3. A method as set forth in claim 1 and further comprising a step of: in response to the halted application program starting to run, deleting the second window.

4. A method as set forth in claim 1 wherein the step of painting includes a preliminary step of invalidating portions of the copy that correspond to any obscured portions of the window of the halted application program.

5. A method as set forth in claim 4 wherein the step of invalidating includes a step of setting the invalidated portions of the copy to a predetermined color.

6. In a data processing system of a type having a plurality of application programs, wherein application programs are capable of having at least one display screen window associated therewith, a method for operating a display screen window manager to manage a display screen window of an application program that is halted while at least one other application program having a display screen window continues to run, comprising the steps of:

responsive to an application program being halted, copying to a memory the informational content of a window of the halted application program;

intercepting a window re-paint message that is directed to the halted application program; and in response to the intercepted window re-paint message, accessing the memory and re-painting the window of the halted application program with the copy of the window of the halted application program.

7. A method as set forth in claim 6 wherein the step of copying includes a step of determining an area of the display screen means that is occupied by the window of the halted application program.

8. A method as set forth in claim 6 and further comprising a step of:

in response to the halted application program starting to run, deleting the copy of the window of the halted application program.

9. A method as set forth in claim 6 wherein the step of copying includes the steps of:

invalidating portions of the copy that correspond to any obscured portions of the window of the halted application program; and painting the window of the halted application program with the copy having the invalidated portions.

10. A method as set forth in claim 9 wherein the step of invalidating includes a step of setting the invalidated portions of the copy to a predetermined color.

11. A data processing system of a type having a memory, display means, processing means for concurrently executing a plurality of application programs, and a display window manager for creating display windows on said display means and for generating re-paint commands for display windows, wherein an application program is capable of having at least one display window associated therewith, said display window manager further comprising a halted application display window manager that is bidirectionally coupled to said memory and that is responsive to one of said concurrently executed application programs being halted for copying to said memory an informational content of a display window of the halted application program, said halted application display window manager including means for generating a request to create a second display window in registration with the display window of the halted application program such that a re-paint command is not generated for the display window of the halted application program, the second display window being created to be of at least equal size and display screen position as the display window of the halted application program and to be located nearer to an observer along a display depth axis than the display window of the halted application program such that the window of the halted application program is hidden from the view of the observer of the display means, said halted application display window manager further comprising means, responsive to the creation of the second display window, for accessing the memory and painting the second display window with the copy of the informational content of the display window of the halted application program and, responsive to a command to re-paint the second display window, for accessing the memory and re-painting the second display window with the copy of the informational content of the display window of the halted application program.

12. A data processing system as set forth in claim 11 wherein said halted application display window manager is further responsive to the halted application program being restarted for deleting the second display window.

13. A data processing system as set forth in claim 11 wherein said halted application display window manager further includes means for invalidating portions of the copy of the informational content of the display window that correspond to any obscured portions of the display window of the halted application program, and for setting the invalidated portions of the copy to have a predetermined visual characteristic.

14. A data processing system of a type having a memory, display means, processing means for concurrently executing a plurality of application programs, and a display window manager for creating display windows on said display means and for generating re-paint commands for display windows, wherein an application program is capable of having at least one display window associated therewith, said display window manager further comprising a halted application display window manager that is bidirectionally coupled to said memory and that is responsive to one of said concurrently executed application programs being halted for copying to said memory an informational content of a display window of the halted application program, said halted application display window manager being coupled to said display window manager for intercepting a display window re-paint command that is directed to the halted application program and, responsive to the interception of the display window re-paint command, for accessing the memory and re-painting the display window of the halted application program with the copy of the informational content of the display window of the halted application program.

15. A data processing system as set forth in claim 14 wherein said halted application display window manager is further responsive to the halted application program being restarted for deleting the copy of the informational content of the display window from the memory.

16. A data processing system as set forth in claim 14 wherein said halted application display window manager further includes means for invalidating portions of the copy of the informational content of the display window that correspond to any obscured portions of the display window of the halted application program, and for setting the invalidated portions of the copy to have a predetermined visual characteristic.

* * * * *